(12) United States Patent
Takahashi

(10) Patent No.: US 6,343,422 B1
(45) Date of Patent: Feb. 5, 2002

(54) TILT ANGEL MEASURING DEVICE

(75) Inventor: Takashi Takahashi, Tokyo-to (JP)

(73) Assignee: Kabushiki Kaisha Topcon, Tokyo-to (JP)

(*) Notice: Subject to any disclaimer, the term of this patent is extended or adjusted under 35 U.S.C. 154(b) by 0 days.

(21) Appl. No.: 09/561,979

(22) Filed: May 2, 2000

(30) Foreign Application Priority Data

May 31, 1999 (JP) ............................................. 11-152370

(51) Int. Cl.[7] ................................................. G01C 9/06
(52) U.S. Cl. ................................ 33/366.16; 33/366.23; 33/379
(58) Field of Search ........................... 33/365, 377, 379, 33/365.39; 252/62.2

(56) References Cited

U.S. PATENT DOCUMENTS

| | | | |
|---|---|---|---|
| 2,713,726 A | 1/1955 | Dixson | 33/211 |
| 3,020,506 A | 2/1962 | Remington et al. | 338/86 |
| 3,409,993 A | 11/1968 | Hansen | 33/211 |
| 3,497,950 A | 3/1970 | Squire et al. | 29/622 |
| 3,699,661 A * | 10/1972 | Baltz | 33/377 |
| RE32,570 E * | 1/1988 | Conn | 33/365 |
| 4,956,922 A | 9/1990 | Bodewes | 33/366 |
| 5,101,570 A | 4/1992 | Shimura | 33/366 |
| 5,508,833 A | 4/1996 | Saito et al. | 359/80 |
| 5,774,996 A * | 7/1998 | Ogawa et al. | 33/366 |
| 6,123,866 A * | 9/2000 | Shijo | 252/62.2 |
| 6,248,989 B1 * | 6/2001 | Ohishi | 33/366.23 |

FOREIGN PATENT DOCUMENTS

| | | |
|---|---|---|
| DE | 1 228 428 | 11/1966 |
| GB | 733973 | 7/1955 |
| JP | 57-11005 | 3/1982 |
| JP | 57-51046 | 10/1982 |
| JP | 04-26046 | 5/1992 |
| JP | 05-272976 | 10/1993 |
| JP | 06-249656 | 9/1994 |
| JP | 08-145665 | 6/1996 |
| JP | 09-49731 | 2/1997 |
| JP | 09-61162 | 3/1997 |
| JP | 09-292220 | 11/1997 |

* cited by examiner

*Primary Examiner*—Diego Gutierrez
*Assistant Examiner*—Mirellys Jagan
(74) *Attorney, Agent, or Firm*—Nields & Lemack

(57) ABSTRACT

The present invention provides a tilt angle measuring device comprising a glass container with a solution 11' and air bubble 12 sealed therein for measuring a tilt angle by detecting displacement of said air bubble 12, wherein said solution contains N-methylformamide and a solvent.

5 Claims, 6 Drawing Sheets

FIG. 4  AIR BUBBLE LENGTH: 10mm (BELOW ROOM TEMPERATURE)
BUBBLE LENGTH TEMPERATURE CHANGE TARGET VALUE: 10%

|  | NAME OF SOLVENT IN THE SEALED LIQUID | COMPOSITION CONTENT (vol%) | BUBBLE LENGTH TEMPERATURE CHANGE *1 (%) |  | MOBILITY *2 50°C | MOBILITY *2 20°C |
|---|---|---|---|---|---|---|
| THE PRESENT INVENTION | N-METHYLFORMAMIDE ACETONITRILE | 30 70 | 8.0 | ○ | ○ | ○ |
| COMPARATIVE EXAMPLES | N-METHYLFORMAMIDE ACETONITRILE | 20 80 | 9.0 | ○ | △ | △ |
| | N-METHYLFORMAMIDE METHANOL | 33 67 | 11.4 | × | △ | △ |
| | | 20 80 | 10.9 | × | △ | ○ |
| | METHANOL ETHYLETHER | 50 50 | 18.1 | × | ○ | ○ |
| | METHANOL | 100 | 14.6 | × | ○ | ○ |
| | n-OCTANE | 100 | 11.0 | × | ○ | △ |
| | ETHYLBENZENE | 100 | 6.8 | ○ | ○ | ▲ |
| | ETHYLBENZENE METHANOL | 90 10 | 11.7 | × | ▲ | △ |
| | | 80 20 | 9.0 | ○ | ○ | ▲ |
| | | 70 30 | 9.0 | ○ | △ | ○ |
| | ETHYLBENZENE n-HEXANE | 80 20 | 8.6 | ○ | ○ | △ |
| | | 70 30 | 6.8 | ○ | ○ | ▲ |
| | | 60 40 | 9.8 | ○ | ○ | ▲ |
| | ETHYLBENZENE ACETONITRILE | 80 20 | 9.0 | ○ | ○ | △ |
| | ETHYLBENZENE ACETONITRILE METHANOL | 70 15 15 | 9.4 | ○ | ○ | △ |
| | METHANOL WATER | 70 30 | 6.8 | ○ | ○ | △ |
| | | 85 15 | 12.2 | × | ○ | △ |
| | ACETONITRILE WATER | 70 30 | 10.5 | × | △ | △ |
| | n-HEPTANE ETHANOL | 80 20 | 10.5 | × | ○ | ○ |

*1 BUBBLE LENGTH CHANGE (%) = $\left[\dfrac{(\text{BUBBLE LENGTH AT } -20°C) - (\text{BUBBLE LENGTH AT } 50°C)}{\text{BUBBLE LENGTH AT ROOM TEMPERATURE}}\right] \times 100$

*2 ○ : BUBBLE MOBILITY GOOD
△ : MOVEMENT OF BUBBLE SOMEWHAT SLOW OR BUBBLE SOMEWHAT EASILY MOVABLE
▲ : BUBBLE DO NOT MOVE PRECISELY (NOT SUITABLE FOR USE)

TILT ANGEL MEASURING DEVICE

BACKGROUND OF THE INVENTION

The present invention relates to a tilt angle measuring device such as a bubble tube, which is prepared by sealing liquid and air bubble into a glass container so that the air bubble is moved depending on a tilt angle of the glass container.

A bubble tube is used to detect tilting of a device or equipment. This bubble tube comprises a glass container where liquid and air bubble are sealed in. When a system or equipment such as survey instrument is installed, which requires horizontality, a tilt angle measuring device with the bubble tube is used. The movement of air bubble in the bubble tube is photoelectrically detected by a photoelectric bubble tube. Now, a description will be given on a conventional type tilt angle measuring device equipped with such photoelectric bubble tube referring to FIG. 8.

A photoelectric bubble tube 1 comprises a light source 2, photodetection elements 3 and 4, and a bubble tube 5. Tilt angle is detected according to a signal from the photoelectric bubble tube 1.

The light source 2 is positioned under the bubble tube 5, and the optical axis of the light source 2 runs perpendicularly to the axis of the bubble tube 5. A pair of the photodetection elements 3 and 4 is placed at positions opposite to the light source 2 in such manner that the bubble tube 5 is interposed between the photodetection elements. The photodetection elements are separated by a predetermined distance and arranged at positions symmetrical to the optical axis of the light source 2.

A detection light beam 7 emitted from the light source 2 passes through the bubble tube 5 and reaches the photodetection elements 3 and 4. Photodetection currents corresponding to the quantity of the light received by the photodetection elements 3 and 4 are outputted.

The detection light beam 7 emitted from the light source 2 passes through a part of the bubble tube 5 where there is only liquid. In a portion of the bubble tube where there is air bubble, the detection light beam 7 is reflected by boundary surface between the air bubble 12 and the liquid 11. As a result, the detection light beam 7 entering the photodetection elements 3 and 4 is cut off. Therefore, the quantity of the detection light beam 7 entering the photodetection elements 3 and 4 varies according to the position of the air bubble 12. The position of the air bubble 12 moves according to the tilting. Thus, by finding difference of the quantity of the photodetection amount between the photodetection elements 3 and 4, the tilt angle can be detected.

As the liquid to be sealed in the bubble tube of the tilt angle measuring device, hydrocarbons of an alcohol type or an ether type or a mixed solution of these compounds has been widely used in the past. For example, a mixed solution of ethanol and diethyl ether, or a mixed solution of n(normal)-hexane and n(normal)-heptane have been used.

FIG. 9 shows the results of an experiment to determine detection accuracy of the bubble tube 5 where a conventional mixed solution of hydrocarbon type (in this case, n-hexane and n-heptane) is used. FIG. 9 shows an example of the results of measurement on the relation between a tilt angle and a sensor output in the range of ±4' when temperature of the sealed liquid is sequentially changed in a cycle of 25° C.→−20° C.→50° C.→25° C.

In this example, the reproducibility in the range of ±4' at 25° C. is 10" at maximum, temperature shift of zero point (origin) in the range of −20° C. to 50° C. is about 0.12"/° C., temperature drift of sensitivity in the range of ±3' is about 12%. Linearity (operating range) is obtained in the range of ±3'.

However, in the conventional type bubble tube 5 containing hydrocarbon mixed solution (n-hexane and n-heptane), the reproducibility, the temperature shift of zero point, the temperature drift and the linearity as given above are not sufficiently efficient, and this is attributed to the liquid sealed in the bubble tube. More concretely, the causes are as follows:

That is, the mixed solution used as the liquid sealed in the bubble tube has a high thermal expansion coefficient. For this reason, the size of air bubble sealed in the bubble tube changes widely according to the environmental temperature.

The container where the mixed solution is sealed is made of glass, but the wettability of the mixed solution to glass is low. As a result, air bubble does not move smoothly.

Further, the mixed solution has low thermal conductivity and high specific heat. Accordingly, it does not follow well after environmental temperature change, and this adversely affects the performance characteristics of the bubble tube.

SUMMARY OF THE INVENTION

It is an object of the present invention to provide a tilt angle measuring device, in which a mixed solution having a thermal expansion coefficient of about 1/100 or less of that of the conventionally used solution, having good wettability to glass, and having high thermal conductivity, is sealed in a glass container together with air bubble.

To attain the above object, the tilt angle measuring device according to the present invention comprises a glass container with a solution and air bubble sealed therein for measuring a tilt angle by detecting displacement of the air bubble, wherein the solution contains N-methyl-formamide and a solvent. Further, the present invention provides the tilt angle measuring device as described above, wherein the solvent is a solvent selected from at least one of nitrogen compounds such as acetonitrile, alcohols such as methanol, ethanol, etc., phenols, ethers, acetals, ketones, esters, fatty acids, acid anhydrides, sulfur compounds, compounds having two or more functional groups, or inorganic solvents. Also, the present invention provides the tilt angle measuring device as described above, wherein mixing ratio of N-methylformamide and the solvent is 3:7 in volume ratio.

N-methylformamide as described above has a thermal expansion coefficient of about 1/100 or less of that of a hydrocarbon solution such as methanol, ethanol, n-hexane, n-heptane, etc. as used in the past, has higher thermal conductivity, and better wettability to glass compared with the conventionally used solution.

When a solvent selected from at least one of the following compounds is mixed as a diluent, viscosity of N-methylformamide is decreased: nitrogen compounds such as acetonitrile, alcohols such as methanol, ethanol, etc., phenols, ethers, acetals, ketones, esters, fatty acids, acid anhydrides, sulfur compounds, compounds having two or more functional groups, or inorganic solvents.

When N-methylformamide and the above solvent are mixed at a mixing ratio of 3:7, bubble length temperature change (%) is very low and mobility of air bubble is more satisfactory.

BRIEF DESCRIPTION OF THE DRAWINGS

FIG. 4 is a table showing comparison of performance characteristics of sealing liquid in a bubble tube in the embodiment of the present invention and those of conventional type sealing liquids.

DETAILED DESCRIPTION OF THE PREFERRED EMBODIMENT

Figure 1:
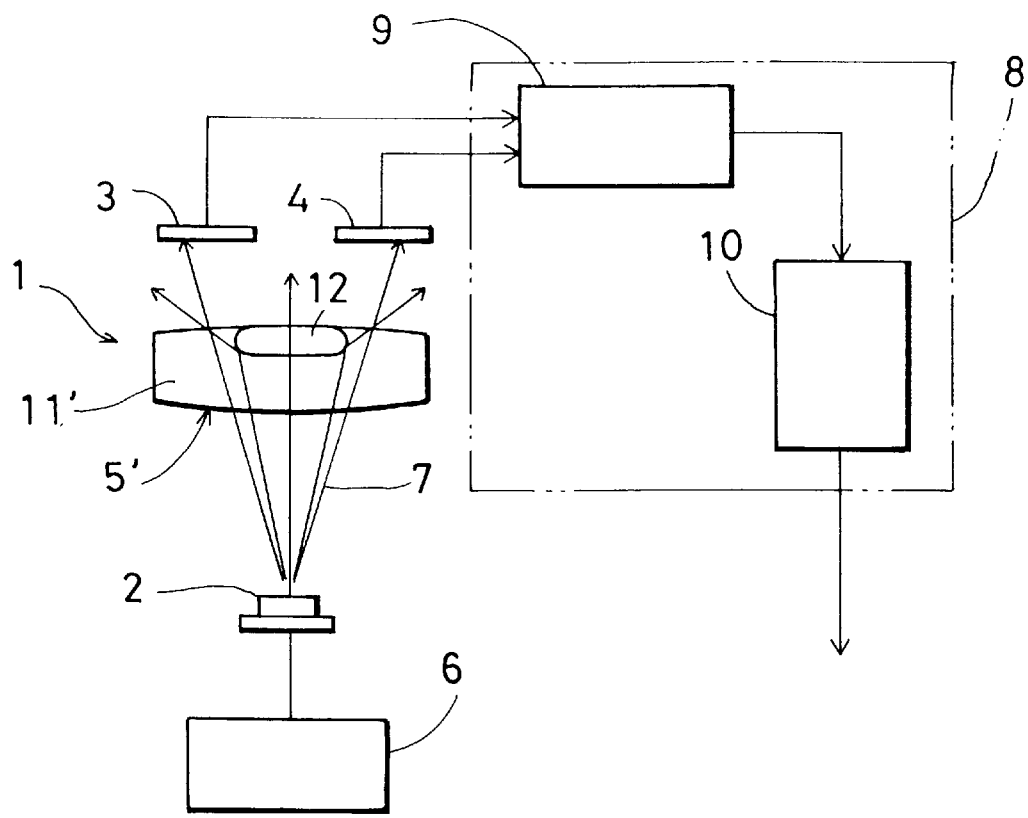
FIG. 1 is a block diagram showing general feature of an embodiment of the present invention.

Description will be given below on an embodiment of the present invention referring to the drawings.

Figure 8:
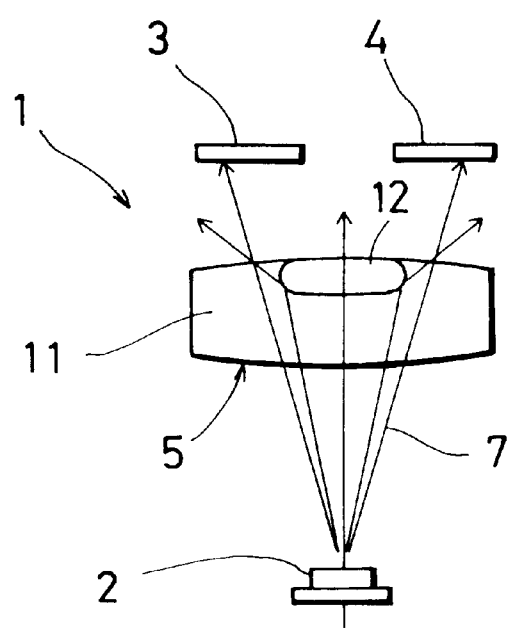
FIG. 8 is a block diagram showing general feature of a conventional device.

A tilt angle measuring system with a photoelectric bubble tube will be described below referring to FIG. 1. In the present embodiment, the detailed features and arrangement of the liquid in the bubble tube are different from those of the conventional example as described above, but the other features are the same as in the conventional example. In FIG. 1, the same components as in FIG. 8 are referred by the same symbols.

The photoelectric bubble tube 1 comprises a light source 2, photodetection elements 3 and 4, and a bubble tube 5'. A tilt angle is detected according to a signal from the photoelectric bubble tube 1.

The light source 2 is disposed under the bubble tube 5', and the optical axis of the light source 2 runs perpendicularly to the axis of the bubble tube 5'. A pair of the photodetection elements 3 and 4 are arranged on the opposite side to the light source 2 with the bubble tube 5' between the photodetection elements and the light source. The photodetection elements 3 and 4 are placed at positions symmetrical with respect to the optical axis of the light source 2 and are separated by a predetermined distance. As the photodetection elements 3 and 4, photoelectric conversion elements are used.

The light source 2 is driven by a light source driving unit 6, and a detection light beam 7 emitted from the light source 2 passes through the bubble tube 5' and reaches the photodetection elements 3 and 4. Then, a photodetection current corresponding to the quantity of the light received by the photodetection elements 3 and 4 is outputted to a tilt angle detection control unit 8. The tilt angle detection control unit 8 comprises a differential amplifier 9 and a control arithmetic unit 10. Differences of electric current in output signals from the two photodetection elements 3 and 4 is amplified by the differential amplifier 9, and it is converted by current-voltage conversion and is outputted to the control arithmetic unit 10. At the control arithmetic unit 10, the signal from the differential amplifier 9 is processed, and the tilt angle is calculated.

The detection light beam 7 emitted from the light source 2 passes through a portion of the bubble tube 5' where there is only liquid 11', but when it passes through a portion of the bubble tube where there is air bubble 12, it is reflected by boundary surface between the bubble 12 and the liquid 11'. As a result, the light beam entering the photodetection elements 3 and 4 is cut off. Therefore, the quantity of the detection light beam 7 entering the photodetection elements 3 and 4 varies according to the position of the bubble 12. Because the position of the bubble 12 moves depending on tilting of the bubble tube 5', by detecting the difference of the light quantity between the photodetection elements 3 and 4, the tilt angle can be detected.

A tilt angle measuring device as described above is installed in various types of survey instrument, e.g. in a laser survey instrument. In the following, referring to FIG. 2 and FIG. 3, description will be given on general features of a laser survey instrument where the tilt angle measuring device is installed.

In the laser survey instrument, a laser beam having a directivity is projected in a horizontal direction by rotary irradiation to form a plane of irradiation. A photodetection device (not shown) positioned on the plane of rotary irradiation receives and detects the laser beam and determines the position of irradiation. As a result, a reference line and a reference plane are obtained.

A laser beam projecting unit 14 is supported in such manner that it can be tilted in any direction. At its head, the laser beam projection unit 14 has a rotator 15, which can be rotated around the optical axis of the laser beam projecting unit 14. Photoelectric bubble tubes 16 and 17 positioned perpendicularly to each other on a horizontal plane are provided on the laser beam projecting unit 14. Further, a tilt sensor 18 for a vertical direction is arranged. The tilt sensor 18, the photoelectric bubble tubes 16 and 17 and a tilt detection control unit 19 constitutes a tilt detecting system.

A laser beam 21 projected in a vertical direction is deflected by the rotator 15 in a horizontal direction, and the rotator is rotated by a scanning motor 22, and the laser beam 21 is irradiated by rotary irradiation.

From the laser beam projecting unit 14, arms 23 and 24 (the arm 24 is not shown in the figure) is extended in two horizontal directions running perpendicularly to each other. The tip of each of the arms 23 and 24 is engaged in a tilting mechanism.

The tilting mechanism comprises two sets of tilt driving units 25 and 26 (the tilt driving unit 26 is not shown in the figure) provided for the arms 23 and 24 respectively, and a tilt controller (not shown) for controlling the tilt driving units 25 and 26. Each of the tilt driving units 25 and 26 comprises a screw 27 extending in a direction of the optical axis of the laser beam projecting unit 14, a nut 28 screwed on the thread of the screw 27 and in contact with the tip of each of the arms 23 and 24, and a tilt adjusting motor 32 for rotating the screw 27 via gears 30 and 31. What is shown by a reference numeral 29 in the figure is a focus adjusting unit, which focuses the laser beam 21 by moving a condenser lens 33 positioned on the optical path of the laser beam projecting unit 14 in a direction of the optical axis.

Figure 2:
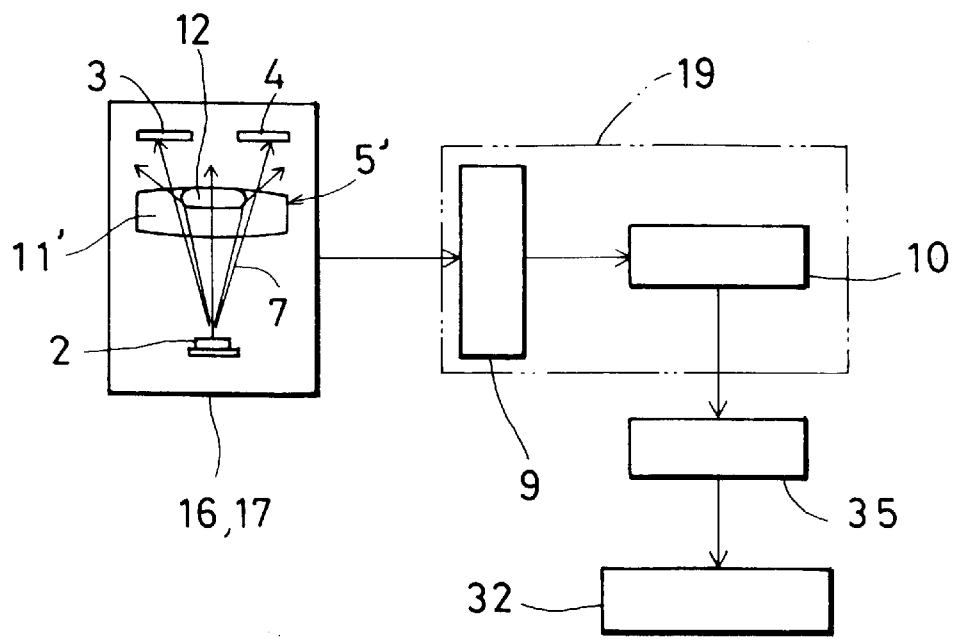
FIG. 2 is a block diagram showing essential feature of a tilt angle measuring device used on a laser survey instrument.
Figure 3:
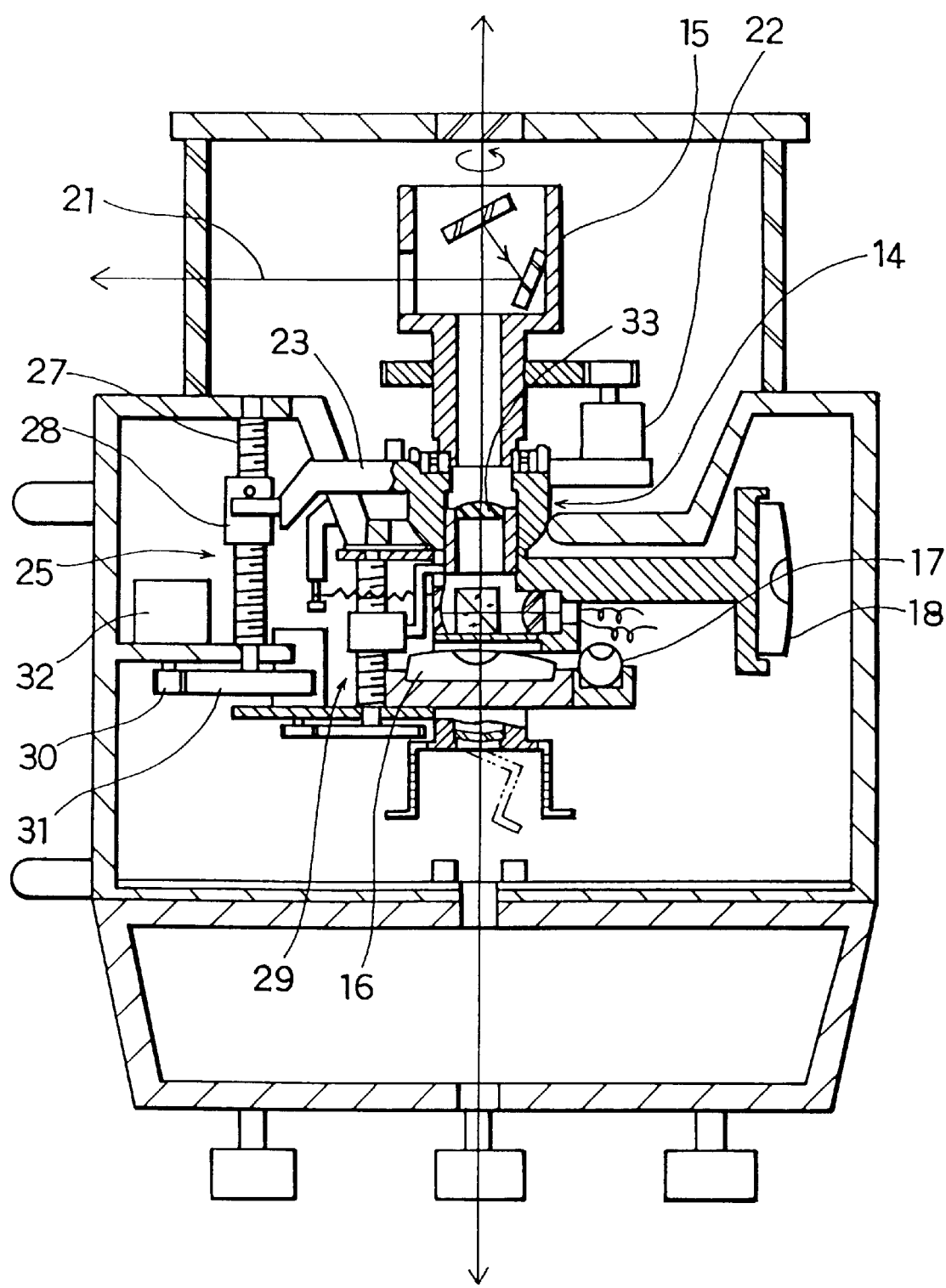
FIG. 3 is a schematical cross-sectional view of a laser survey instrument, in which a tilt angle measuring device is installed.

As shown in FIG. 2, the tilt angle detection control unit 19 comprises the differential amplifier 9 where the photodetection signals from the photodetection elements 3 and 4 are inputted, and the control arithmetic unit 10 for issuing a control signal based on the signal from the differential amplifier 9. Based on the control signal from the control arithmetic unit 10, a driving circuit 35 drives the tilt adjusting motor 32, and the optical axis of the laser beam projecting unit 14 is adjusted in a vertical direction or at a predetermined angle.

The laser beam 21 is projected in the horizontal direction from the rotator 15. When the rotator 15 is rotated by the scanning motor 22, a plane of irradiation is formed. By setting a scanning position of the laser beam at a predetermined position by the photodetection device, a reference plane can be obtained.

When the reference plane is obtained, an operator can easily determine working positions in a wide range. For example, this includes the setting of window positions in room interior finishing work in building construction or land grading in civil engineering work.

The bubble tube 5' in the photoelectric bubble tubes 1, 16 and 17 is a transparent glass container. In this glass container, a transparent solution containing N-methylformamide and a solvent is sealed.

N-methylformamide as described above has a thermal expansion coefficient of $0.08 \times 10^{-3}/°C$. This is as low as about 1/100 of the thermal expansion coefficient of conventional hydrocarbon liquid such as methanol ($1.19 \times 10^{-3}/°C$), ethanol ($1.08 \times 10^{-3}/°C$), n-hexane ($1.35 \times 10^{-3}/°C$) or n-heptane ($1.22 \times 10^{-3}/°C$). Also, it has high thermal conductivity and good wettability to glass (see FIG. 4).

However, N-methylformamide has high viscosity, and acetonitrile is mixed in it as a solvent. From experiment results, it was found that, when a mixing ratio of N-methylformamide to acetonitrile is 3:7 (volume ratio) as shown in FIG. 4, bubble length temperature change (%) is very low and the mobility of bubble is satisfactory.

As the solvent, in addition to acetonitrile, alcohols such as methanol, ethanol, 1-propanol, 2-propanol, isobutyl alcohol, isopentyl alcohol, benzyl alcohol, cyclohexanol, etc. may be used.

Further, the following compounds may be used as the solvent: hydrocarbons such as toluene, xylene, ethylbenzene, naphthalene, tetralin, butylbenzene, diethylbenzene, pentylbenzene, cyclohexane, etc., phenols such as phenol, cresol, xylenol, etc., ethers such as diethyl ether, dipropyl ether, diisopropyl ether, dibutyl ether, etc., acetals, ketones such as acetone, methylethylketone, methylisobutylketone, etc., acid anhydride solutions, esters such as methyl formate, ethyl formate, propyl formate, butyl formate, methyl acetate, ethyl acetate, propyl acetate, butyl acetate, etc., fatty acids, nitrogen compounds such as nitromethane, nitroethane, nitrobenzene, acetonitrile, propionitrile, succinonitrile, butyronitrile, isobutyronitrile, valeronitrile, benzonitrile, etc., sulfur compounds such as carbon disulfide, dimethyl sulfide, diethyl sulfide, etc., compounds having two or more functional groups such as 2-methoxyethanol, 2-ethoxyethanol, 2-(methoxymethoxy)-ethanol, 2-isopropoxyethanol, diethylene glycol, triethylene glycol, lactic acid, lactic acid ester, methyl salicylate, methyl acetoacetate, ethyl acetoacetate, etc., water, or inorganic solvents such as propylene carbonate, etc.

When these solvents are added to N-methylformamide, the solution has kinetic viscosity of 0.3 to 0.8 cPs (25° C.), boiling point of 60° C. to 130° C., and freezing point of lower than or equal −30° C. The solution also has the low thermal expansion coefficient, high thermal conductivity, and good wettability to glass.

As described above, when the mixed solution containing N-methylformamide and methanol, ethanol, etc. is used, the solution has the lower thermal expansion coefficient, higher thermal conductivity and good wettability to glass. This is because N-methylformamide is a polar solvent. The polarity of hydrocarbon molecules such as methanol, ethanol, etc. attracts the polarity of N-methylformamide, and a complex is formed and a coordinate bond occurs.

Figure 5:
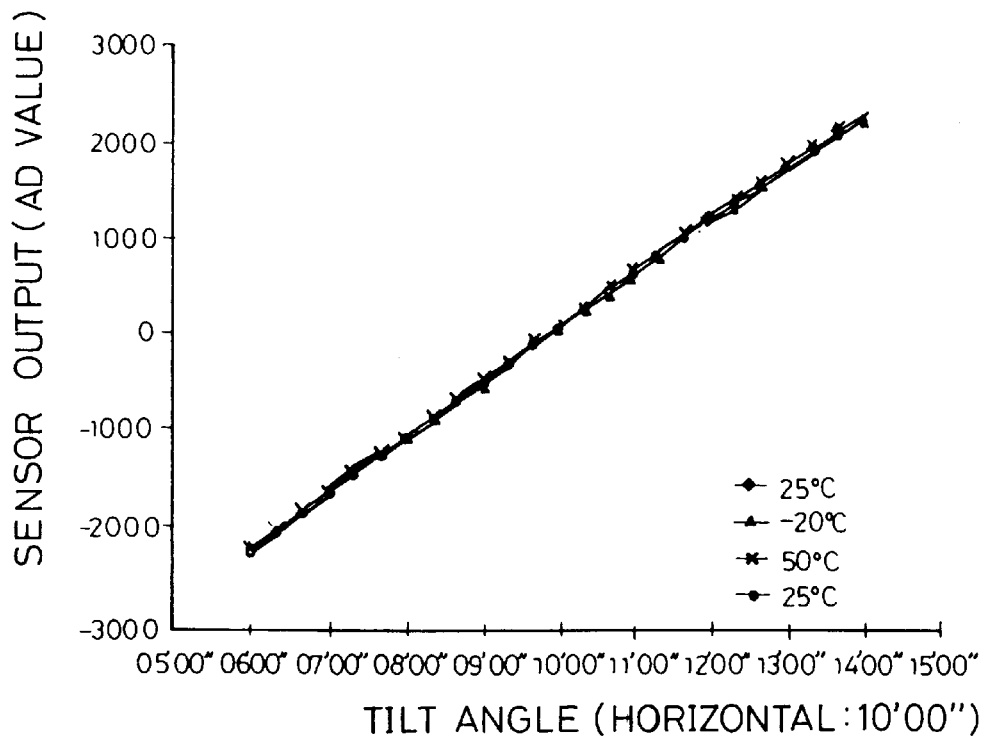
FIG. 5 is a diagram to show operational behavior of the embodiment of the present invention.

FIG. 5 shows the results of experiment to prove detection accuracy of the bubble tube 5' with the mixed solution sealed in it according to the present invention.

FIG. 5 shows an example of the results of the measurement of the relation between the tilt angle and the sensor output within ±4' when environmental temperature was sequentially changed as 25° C.→−20° C.→50° C.→25° C. In this example, the reproducibility in the range of ±4' at 25° C. is 6' or less, and the temperature shift of zero point (origin) in the range of −20° C. to 50° C. is about 0.07"/° C. The temperature drift of sensitivity in the range of ±3' is about 6%. The good linearity (operating range) is obtained in the range of ±4'.

Figure 9:
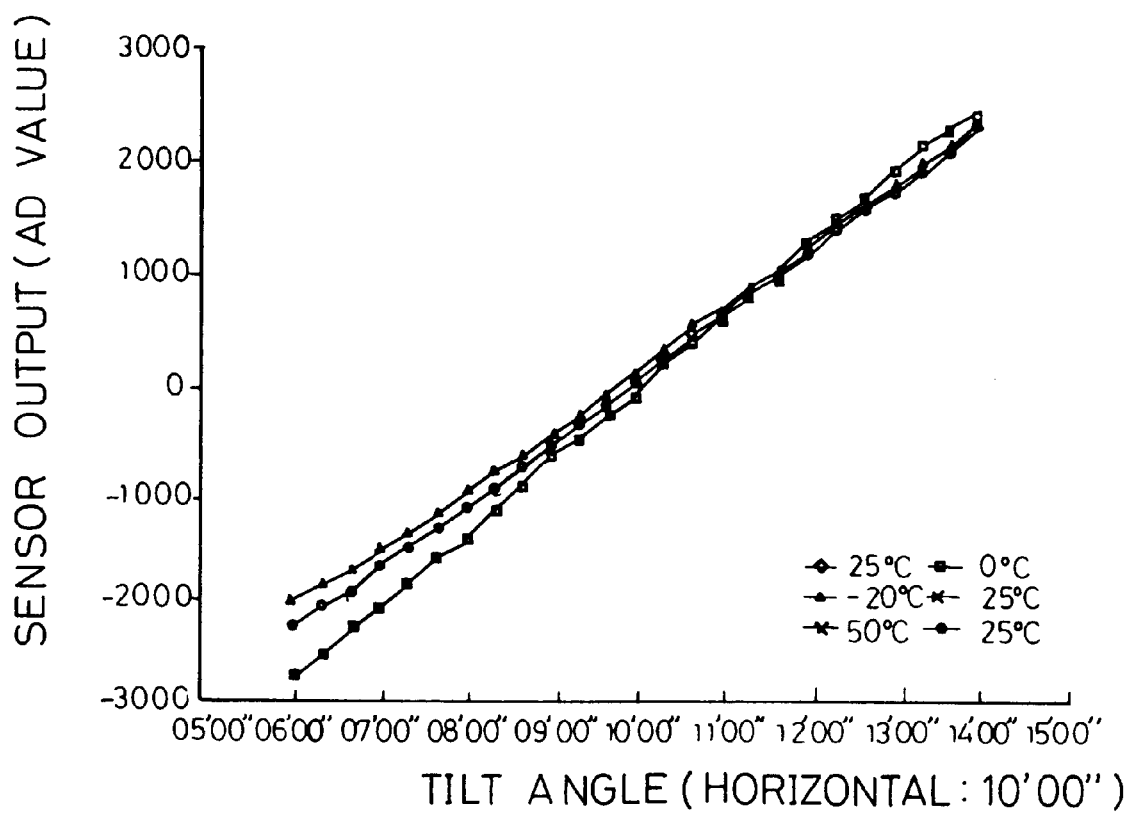
FIG. 9 is a diagram showing operational behavior of the conventional type device.

In case the solution is the conventional type hydrocarbon mixed solution, as shown in FIG. 9, the reproducibility is 10" at maximum, the temperature shift of zero point (origin) is 0.12"/° C. at maximum, the temperature drift of sensitivity is 12% at maximum, and the operating range is ±3' or more. Thus, the detection accuracy is extensively improved by the present invention.

Further, a temperature change test (heat shock) and a durability test such as the test over time were performed using a bubble tube of the present invention with the mixed solution sealed in it. The results are summarized in FIG. 6 and FIG. 7.

Figure 6:
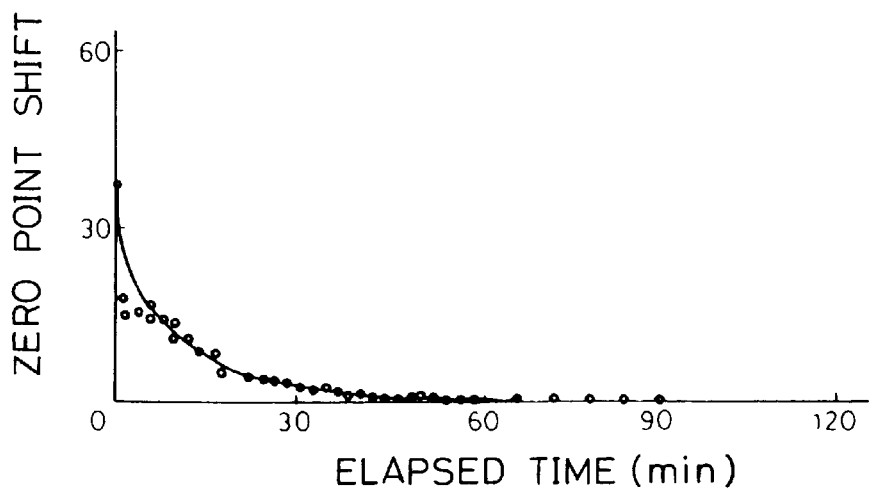
FIG. 6 is a diagram to show operational behavior of the embodiment of the present invention.

FIG. 6 shows the results of the measurement showing how the zero point shift is changed over time when the mixed solution was subjected to a sudden temperature change from 55° C. to 25° C.−30° C. More than one hour is required until zero point shift is eliminated. However, the values returned to 15" or less in 10 minutes and to 6" or more in 20 minutes, and this means that there is practically no problem.

Figure 7:
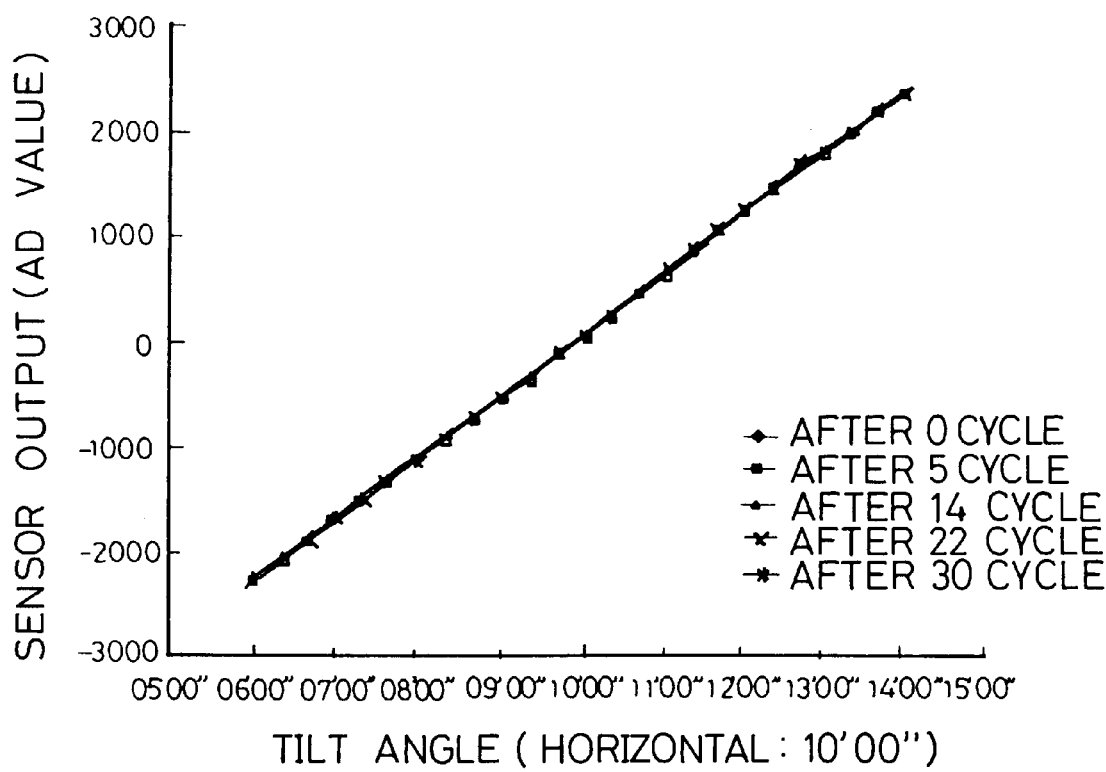
FIG. 7 is a diagram to show the operational behavior of the above embodiment.

FIG. 7 shows an example of the results of the measurement when the experiment was performed by repeating the temperature cycle of (25° C.→−30° C.→60° C.→25° C.; 8 hours) for 30 times to observe the changes of the relation between the tilt angle and the sensor output at 25° C. The shift of about 7" in the shift width is seen all over the entire range, but there is no change in sensitivity, and there is practically no problem. In the results of 3 bubble tubes under the test, the shift amount was 10" at maximum, and there was no change in sensitivity.

These results reveal that the solution sealed in the tilt angle measuring device (bubble tube) according to the present invention is superior to the conventional type liquid of alcohol type or ether type, etc. in the parameters such as a thermal expansion coefficient, thermal conductivity, wettability to glass, sensitivity to environmental temperature change, and durability to environmental temperature.

The tilt angle measuring device according to the present invention is not limited to the solvents as described in the above embodiment, and it is needless to say that two or more types of solvents may be combined and used.

According to the present invention, a solution containing N-methylformamide and solvents is sealed in the bubble tube of the tilt angle measuring device. As a result, a thermal expansion coefficient of the solution is as low as about 1/100 of the conventional hydrocarbon solution of alcohol type or ether type, and the size of bubble hardly change due to environmental temperature change. Further, because it has very good wettability to glass, the air bubble moves smoothly. The thermal conductivity is low and the specific heat is high. Accordingly, the solution can follow well after the change of environmental temperature. This contributes to the improvement of performance characteristics of the bubble tube and of detection accuracy of the tilt angle measuring device.

What is claimed is:

1. A tilt angle measuring device, comprising a glass container with a solution and air bubble sealed therein for measuring the tilt angle by photoelectrically detecting displacement of said air bubble, wherein said solution contains N-methyl-formamide and a solvent.

2. A tilt angle measuring device according to claim 1, wherein said solvent is selected from the group consisting of nitrogen compounds, alcohols, phenols, ethers, acetals, ketones, esters, fatty acids, acid anhydrides, sulfur compounds, compounds having two or more functional groups, and inorganic solvents.

3. A tilt angle measuring device according claim 1 or 2, wherein a mixing ratio of N-methylformamide and said solvent is 3:7 in a volume ratio.

4. A tilt angle measuring device according to claim 1, wherein said nitrogen solvent is acetonitrile.

5. A tilt angle measuring device according to claim 1, wherein said solvent is methanol or ethanol.

* * * * *